(12) United States Patent
Agrawal et al.

(10) Patent No.: US 8,082,278 B2
(45) Date of Patent: Dec. 20, 2011

(54) GENERATING QUERY SUGGESTIONS FROM SEMANTIC RELATIONSHIPS IN CONTENT

(75) Inventors: Nitin Agrawal, Redmond, WA (US); Krishna Gade, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 12/138,970

(22) Filed: Jun. 13, 2008

(65) Prior Publication Data
US 2009/0313237 A1 Dec. 17, 2009

(51) Int. Cl.
*G06F 17/30* (2006.01)
(52) U.S. Cl. .................................................. 707/802
(58) Field of Classification Search ............. 707/609, 707/705, 723, 731, 790, 802
See application file for complete search history.

(56) References Cited

U.S. PATENT DOCUMENTS

| | | | |
|---|---|---|---|
| 6,006,225 A | 12/1999 | Bowman | |
| 7,921,109 B2 * | 4/2011 | Parikh et al. | 707/731 |
| 2005/0055341 A1 | 3/2005 | Haahr | |
| 2005/0234972 A1 | 10/2005 | Zeng | |
| 2006/0047701 A1 | 3/2006 | Maybury | |
| 2007/0100915 A1 | 5/2007 | Rose | |
| 2007/0150466 A1 | 6/2007 | Brave | |
| 2007/0208714 A1 | 9/2007 | Ture | |
| 2007/0288427 A1 | 12/2007 | Ramer | |
| 2008/0301120 A1 * | 12/2008 | Zhu et al. | 707/5 |

OTHER PUBLICATIONS

Turney, Learning to Extract Keyphrases from Text, Feb. 17, 1999, http://arxiv.org/ftp/cs/papers/0212/0212013.pdf.
Desikan, et al., Web Mining for Self-Directed E-learning, Feb. 27, 2008, http://www-users.cs.umn.edu/~desikan/publications/Web-Mining-for-E-learning.pdf.
Widyantoro, et al., A Fuzzy Ontology-Based Abstract Search Engine and Its User Studies, Feb. 27, 2008, http://ist.psu.edu/yen/publications/fuzzieee01.pdf.
Ferragina, et al., The Anatomy of a Clustering Engine for Web-page Snippets, Jan. 29, 2004, http://citeseer.ist.psu.edu/cache/papers/cs/31695/ftp:zSzzSzftp.di.unipi.itzSzpubzSztechreportszSzTR-04-05.pdf/ferragina04anatomy.pdf.
Velez, et al., Fast and Effective Query Refinement, Feb. 27, 2008, http://www.psrg.lcs.mit.edu/publications/Papers/sigir97.pd.

* cited by examiner

*Primary Examiner* — Fred I Echichioya
(74) *Attorney, Agent, or Firm* — Shook Hardy & Bacon LLP

(57) ABSTRACT

A method for suggesting related queries to a user query using semantic relationships that are present in informational content stored in public domains. Semantic relationships between named entities are discovered and the named entities are extracted. The entities are indexed according to the relationships. When a user query is received that includes one of the entities, query suggestions are returned to the user based on indexed relationships corresponding to the entity named in the user query.

20 Claims, 4 Drawing Sheets

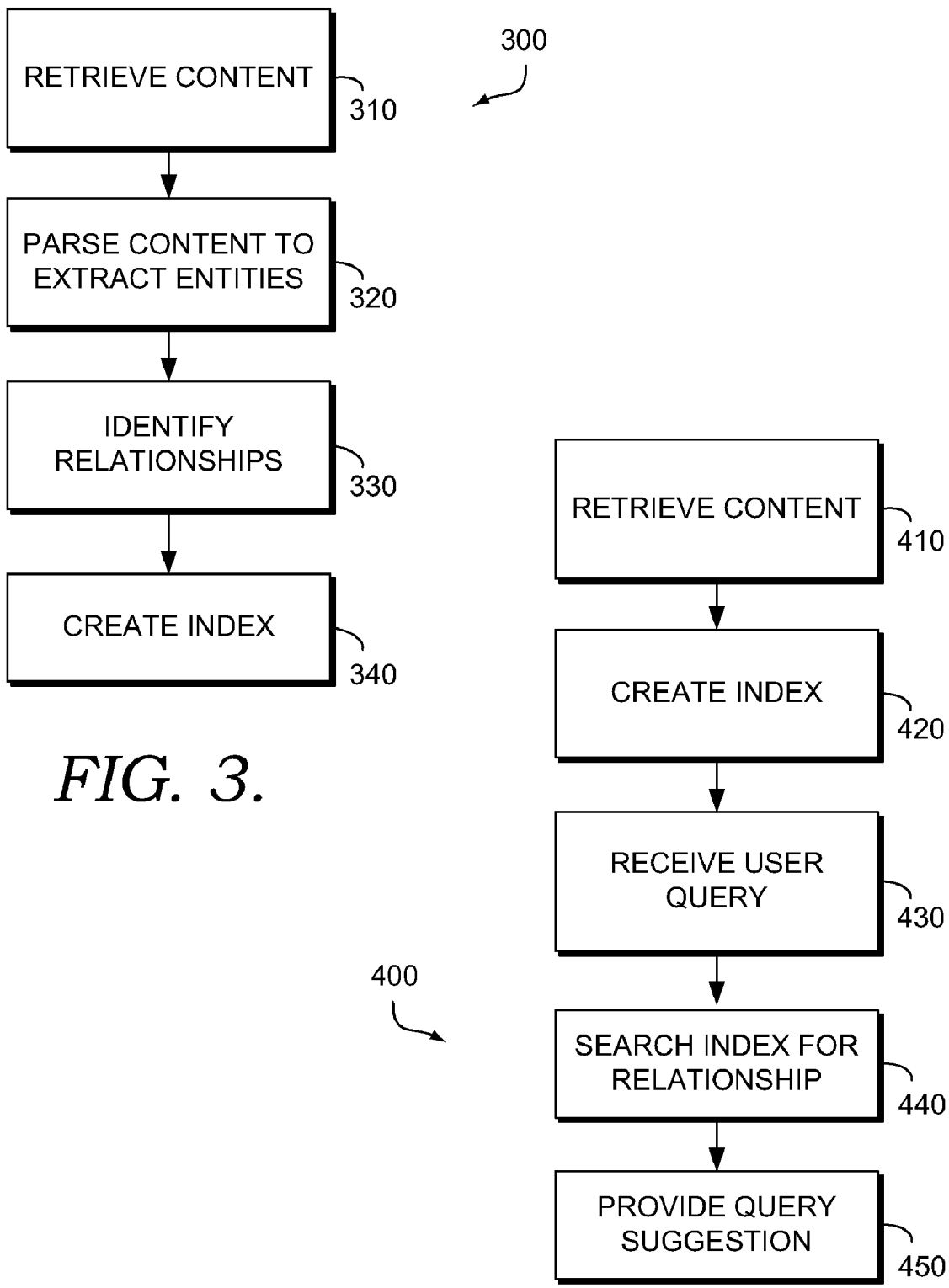

GENERATING QUERY SUGGESTIONS FROM SEMANTIC RELATIONSHIPS IN CONTENT

SUMMARY

The invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention allow for creating a searchable index of entities associated with informational content that is available from a content server. The index may include entries that reference relationships between entities, wherein relationships are defined when two entities appear within a certain distance of each other in an instance of content. The relationships may include mappings between entities which can be used to generate query suggestions.

According to an embodiment of the invention, a user query defining a first entity is received from a search engine. The first entity is compared against an index of entities to determine whether there is a corresponding index entry. If a corresponding index entry is found, a query suggestion may be provided to the user, wherein the query suggestion is based upon information from the index. The query suggestion may be interactive such that the user is provided a direct link to query results corresponding to the suggested query.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein:

FIG. 3 is a flow diagram illustrating an exemplary method of suggesting additional queries related to a user's query according to an embodiment of the present invention;

FIG. 4 is a flow diagram illustrating an exemplary method for suggesting additional queries related to a query for an entity associated with content available from an informational database according to an embodiment of the present invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
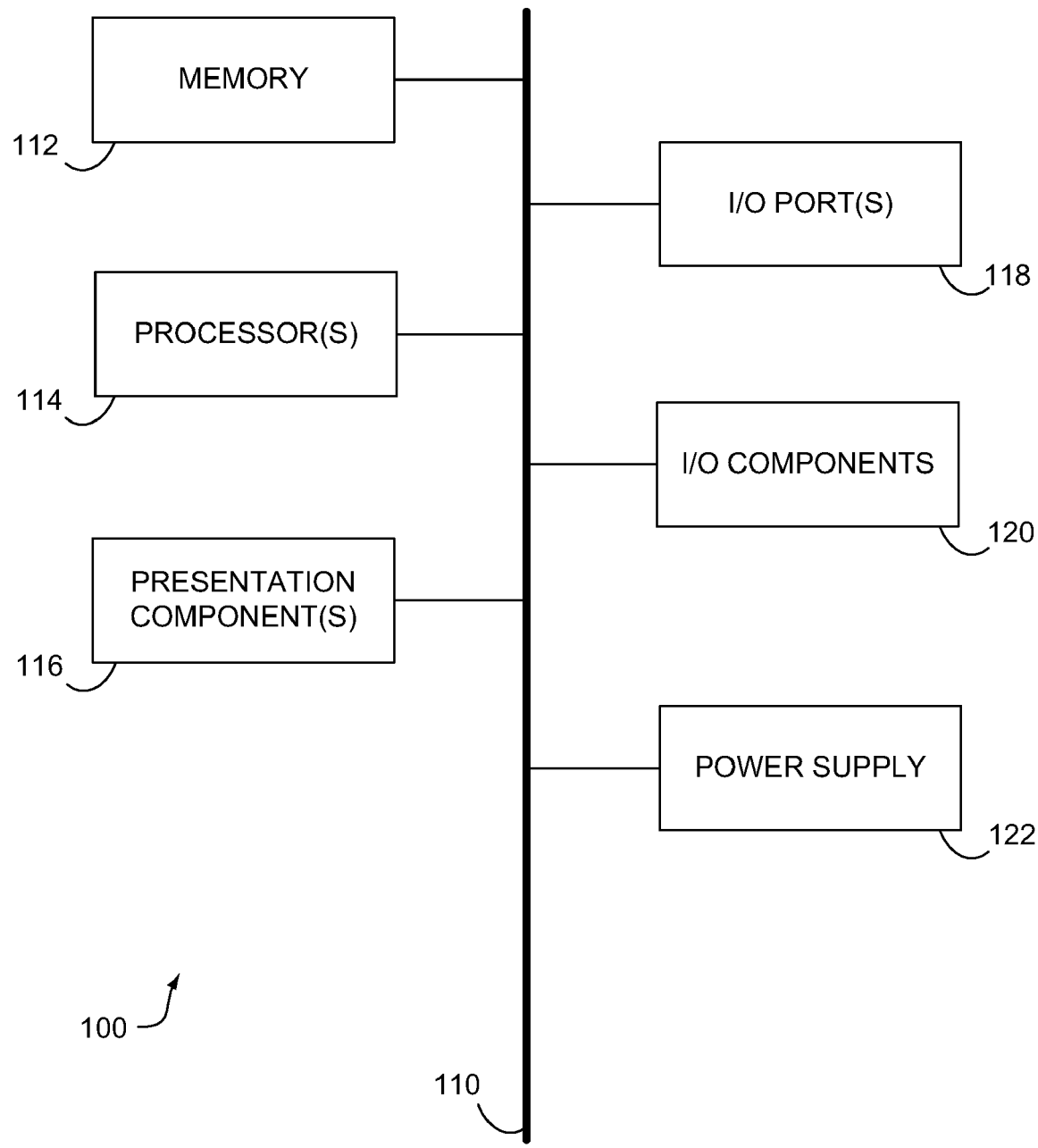
FIG. 1 is a block diagram of an exemplary computing environment suitable for use in implementing the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, an exemplary computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-readable storage media. Computer-readable storage media includes both volatile and nonvolatile, removable and non-removable media implemented in any method or technology for storage of information such as computer-readable instructions, data structures, program modules or other data. Computer-readable storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse.

As previously mentioned, in one embodiment, the present invention relates to providing query suggestions to a user in response to receiving a query submitted by the user.

Figure 2:
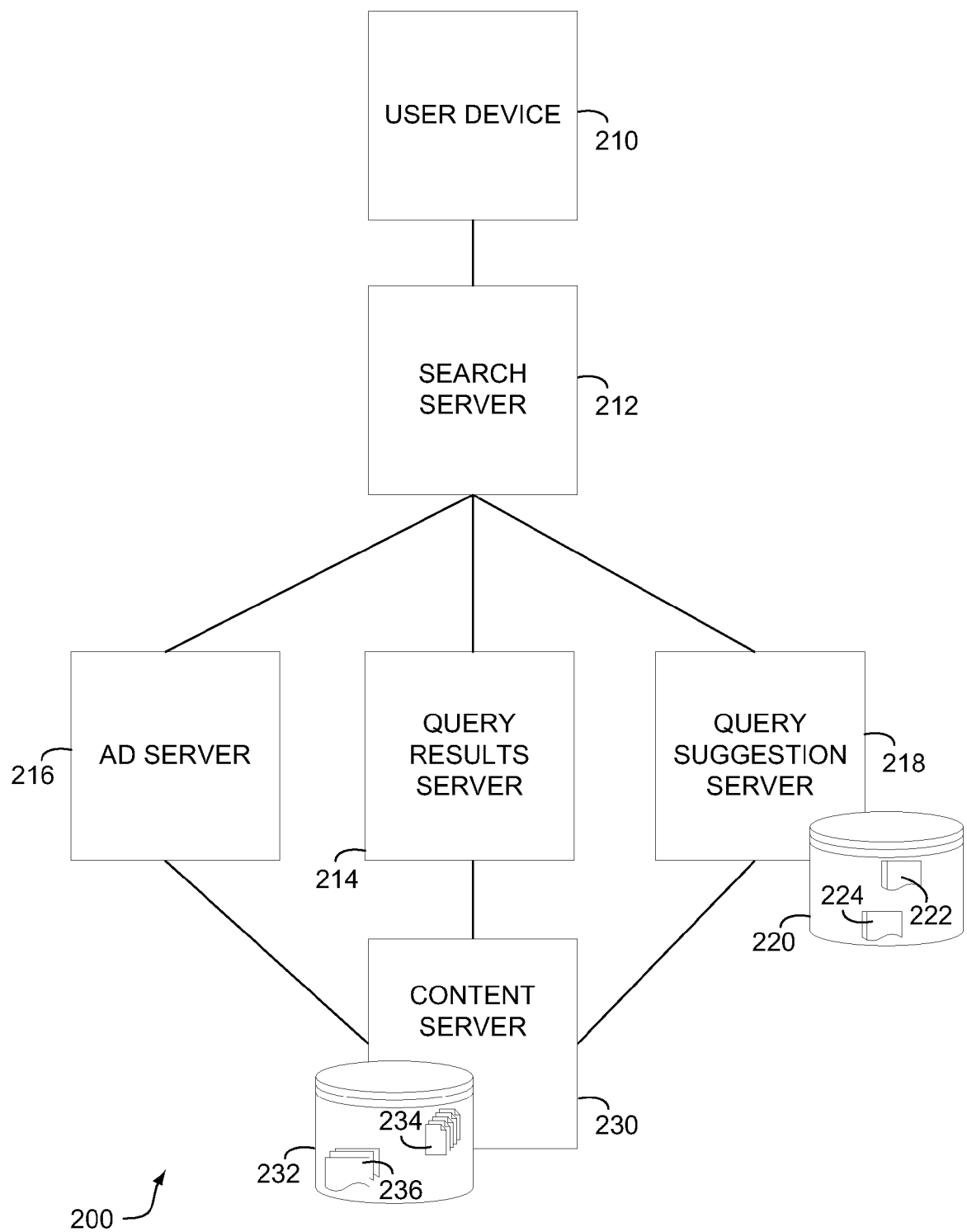
FIG. 2 is a block diagram illustrating an exemplary networking environment according to an embodiment of the present invention.

Turning to FIG. 2, a block diagram is shown, illustrating the relevant components of an exemplary networking environment 200 according to an embodiment of the present invention. Exemplary networking environment 200 is an environment that provides search services to a user, wherein the user may submit a query, i.e. perform a search, and retrieve search results in response. Exemplary networking environment 200 includes user device 210, search server 212, query results server 214, ad server 216, query suggestion server 218, and content server 230.

It should be understood that the network elements illustrated in FIG. 2 are scalable. That is, there may be any number of user devices, search servers, ad servers, query results servers, query suggestion servers, and content servers associated with a particular networking environment. Additionally, there may be other elements not shown in FIG. 2 that provide various functionalities, services, interfaces, and the like. The exemplary networking environment 200 is only one of a number of possible configurations, and is illustrated as having a limited number of network elements for simplicity and clarity. The illustrations and descriptions herein are not intended to limit the functionality, configuration, or other aspect of any network suitable for implementing embodiments of the present invention.

Search server 212, as well as any or all of the other servers 214, 216, 218, and 230 illustrated in FIG. 2 may be implemented as server systems, program modules, virtual machines, components of a server or servers, networks, and the like. In one embodiment, for example, each of the servers 214, 216, 218, and 230 is implemented as a separate server. In another embodiment, all of the servers 214, 216, 218, and 230 are implemented on a single server or a bank of servers.

User device 210, illustrated in FIG. 2, is a communication device that a user can utilize to perform a search by submitting a query to the search server 212. User device 210 can be a computing device such as computing device 100 described above with reference to FIG. 1, although the nature of user device 210 is not limited to this description.

In an embodiment, user device 210 is separate and distinct from search server 212 and/or the other servers illustrated in FIG. 2. In another embodiment, user device 210 is integrated with one or more of servers 212, 214, 216, 218, and 230. For clarity of explanation, we shall describe embodiments in which each of user device 212, and servers 214, 216, 218, and 230 are separate while understanding that this may not be the case in various configurations contemplated within the present invention.

As shown in FIG. 2, user device 210 communicates with search server 212. Search server 212 receives user queries, i.e., search requests, from user device 210. Search server 212 may be or include, for example, a search engine, a crawler, or the like. Search server 212, in some embodiments, is configured to perform a search using a query submitted by user device 210. In other embodiments, search server forwards the user query to another network element such as, for example, query results server 214, which may perform the search. In various embodiments, search server 212 can provide a user interface for facilitating a search experience for a user communicating with user device 210. In an embodiment, search server 212 monitors searching activity, and can produce one or more records or logs representing search activity, previous queries submitted, search results obtained, and the like. These services can be leveraged to improve the searching experience in many different ways.

As illustrated in FIG. 2, search server 212 communicates with a query results server 214, an ad server 216, and a query suggestion server 218. In an embodiment, the search server 212 only communicates with one or two of servers 214, 216, and 218, and in other embodiments, search server 212 communicates with all three. In an embodiment of the present invention, when search server 212 receives a query from user device 210, search server 212 forwards that query to each of ad server 216, query results server 214, and query suggestion server 218. In some embodiments, the copies of the submitted query are forwarded simultaneously to each of the other servers, and in other embodiments, the copies are forwarded at different times.

In other embodiments, the information forwarded from search server 212 to one or more of the query results server 214, ad server 216, and query suggestion server 218 are not copies of the original submitted query. In an embodiment, different information is forwarded to each of two or more of servers 214, 216, and 218. The information can be targeted particularly at the service or services offered and/or performed by a particular server. For example, in one embodiment, a copy of the submitted query is forwarded to the query results server, while information sufficient to notify ad server 216 that a particular type of advertising content should be submitted with query results is forwarded to ad server 216. In other embodiments, a copy of a query and/or information corresponding to the query is forwarded to query suggestion server 218.

With continued reference to FIG. 2, the exemplary networking environment 200 includes query results server 214. Query results server 214 can include a search engine, crawling component, querying component, or the like. In an embodiment, query results server 214 is configured to receive a submitted query and to use the query to perform a search, such as by using the query to determine if content server 230 contains any content satisfying the terms of the user search. In an embodiment, upon discovering query results that satisfy the submitted query, query results server 214 returns the query results to user device 210 by way of a graphical interface maintained by search server 212.

Query results can include content of any kind such as, for example, a list of documents, files, or other instances of content that satisfy the submitted query. In another embodiment, query results include the actual content that satisfies the submitted query. In still further embodiments, query results include links to content, suggestions for future queries, and the like. In an embodiment, query results server 214 communicates a message to user device 210 if the submitted query does not yield any results. The message informs user device 210 that the submitted query did not yield any results. In another embodiment, query results server communicates the failure to obtain results to search server 212, which sends a notification to user device 210 indicating the same.

In various embodiments of the present invention, query results server 214 is configured to determine whether content server 230 is capable of providing a certain instance or instances of content that satisfy a query submitted by user device 210. In one embodiment, query results server 214 can query content server 230 or a database residing thereon directly to determine whether content satisfying a query can be retrieved. In another embodiment, query results server 214 forwards the submitted query, or information corresponding thereto, to content server 230, which performs its own query of an associated database of content.

As shown in FIG. 2, exemplary networking environment 200 includes content server 230 for providing content to user device 210, such as, for example, in response to a user query. As shown in FIG. 2, content server 230 includes database 232 for storing content. It should be understood by those of ordinary skill in the art that database 232 is scalable, and that there may actually be a number of databases associated with content server 230. Database 232 can reside on the same machine as content server 230. In another embodiment, database 232 is remote from content server 230, and in either case, content server 230 communicates with database 232 to perform searches and retrieve content stored on database 232.

In one example, database 232 includes informational content 234 available for a user of user device 210 to experience. In the context of this invention, informational content includes content that may provide information to a user. Informational content can include, for example, research reference content (e.g., encyclopedia, dictionary, etc.), academic content (e.g., scholarly articles, working papers, dissertations, etc.), statistical content (e.g., results of studies, etc.), general informational content (e.g., collections of facts, etc.), and the like. Informational content provides information about any number of subjects, including, for example, sociology, psychology, science, information technology, entertainment, mass media, advertising, sports, and the like. Exemplary services of this kind include services such as those offered by Internet Movie Database (IMDb), Digital Bibliography & Library Project (DLBP), CiteSeer, Association for Computing Machinery (ACM) Digital Library, and the like.

Throughout this document, instances of informational content shall be referred to as documents. In this context, a document includes any grouping of information configured for presentation to a user. A document can include a paper, an article, a fact sheet, a list, or other medium of presenting information to a user that may be stored on, and retrieved from, a database. In various embodiments, database 232 stores documents, links, and other content in various files, stores, and the like.

In some embodiments, database 232 includes one or more reference logs 236. Reference log 236 includes data associated with one or more documents. In an embodiment, reference log 236 includes data associated with content 234 and can be used for indexing content, organizing content, keeping track of stored content, and the like. In some embodiments, reference log 236 comprises an XML file containing metadata associated with content 234. In other embodiments, reference log 236 can be formatted in other ways, and can, for instance, include excerpts from one or more documents stored on database 232. In various embodiments, reference log 236 is searchable and/or viewable by a user associated with user device 210. In other embodiments, reference log 236 is inaccessible to user device 210. In still further embodiments, reference log 236 is made available to other service providers such as, for example, query suggestion server 218, search server 212, query results server 214, and/or ad server 216. In an embodiment, for example, reference log 236 is used by query results server 214 to determine whether database 232 includes content satisfying a user query.

Networking environment 200 also includes ad server 216. Ad server 216 receives copies of user queries or information associated with user queries. In an embodiment, ad server 216 selects one or more instances of targeted advertising to serve as companion content to query results that may be provided to a user. In various embodiments, ad server 216 is included within networking environment 200. In various other embodiments, ad server 216 is actually a network of ad servers. The nature and functionality of ad server 216 is not meant to be limited by the discussion herein, and is not germane to the present invention. It should be understood however, that in addition to the communication lines illustrated in FIG. 2, there may be others, including communication lines between the ad server and any of the other network elements. In this way ad server 216 can cull information from various sources in order to more effectively provide targeted advertising to users.

As further illustrated in FIG. 2, networking environment 200 includes query suggestion server 218. Query suggestion server 218 receives copies of user queries and/or information associated with user queries that are submitted to search server 212. In response to receiving user queries, query suggestion server 218 provides query suggestions to user device 210. Query suggestions include search terms which, if submitted as a query to search server 212, would return query results that are related in some way to results returned (or expected to be returned) in response to the query submitted by the user.

In an embodiment, query suggestions are presented as a list of search terms and are provided to the user device 210 along with the query results. In an embodiment, query results server 214 communicates query results to search server 212 and query suggestion server 218 communicates query suggestions to search server 212. Search server 212 configures both the results and the suggestions, as well as any ads provided by ad server 216, for display to the user. In another embodiment, query suggestion server 218 communicates query suggestions directly to user device 210 (through a communication line not illustrated in FIG. 2). In still another embodiment, search server 212 apportions regions of a user interface for use by ad server 216, query results server 214, and query suggestion server 218 such that each of these servers may post ads, results, and suggestions in their respective regions of the user interface.

In various embodiments, query suggestions are presented to a user associated with user device 210 in a variety of ways. In an embodiment, for example, query suggestions are presented as a list of search terms. In another embodiment, query suggestions are presented as links, which may have an accompanying visual indication that they are links. Visual indications of this nature are known, and include, for example, an underlining effect, a blue or other color text, a button, and the like. In embodiments in which query suggestions are presented as links, a link includes a reference to a set of query results corresponding to the query suggestion. That is, if a user clicks on, or otherwise selects, a query suggestion presented as a link, the user is provided with query results corresponding to the query suggestion in much the same manner that the user is provided with query results in response to a user-entered query. In various embodiments, the query results provided to the user in response to selecting a query suggestion link also include further query suggestions.

In another embodiment, selecting a query suggestion link can cause a user interface such as one that may be provided by search server 212 to be presented to the user. In an embodiment, an input field for receiving query input from a user is presented as pre-populated with the query suggestion. In this manner, a user can modify, add to, or otherwise change the query suggestion before retrieving query results. In an embodiment, once the user has modified the query suggestion as desired, the user submits the query suggestion terms as a user query in much the same manner the user would submit a new, user-defined, query. In various other embodiments, query suggestions are presented in many other ways such as, for example, excerpts from query results associated with the query suggestions, thumbnails, images, audio media, video media, and the like. The description herein is not intended to limit the mode, method, or nature of presentation of query suggestions to users.

Query suggestions server 218 includes database 220 that stores information from which query suggestions are generated. Database 220 includes indexes 222 and 224. Indexes 222 and 224 can include a plurality of entries, indexed according to entities. Entities include elements within some content such as, for example, names of persons, organizations, locations, topics, subjects, titles, quantities, percentages, and the like. In an embodiment of the present invention, entities that are indexed in indexes 222 and 224 are entities that can be found within one or more documents 234 stored in database 232, which is associated with content server 230. When query suggestion server 218 receives a query submitted by user device 210, it uses text-matching algorithms to compare one or more terms within the query to the entries in an index 222 and 224. Upon matching a user query with an entity in the index, query suggestion server 218 retrieves information associated with the relevant entry. The information retrieved can include query suggestions, terms that can be used to generate query suggestions, link to content, link to other indexes, and the like.

In an embodiment, index 222 is created by retrieving content from content server 230 such as, for example documents 234. The content is then parsed and entities are extracted from the content. The entities extracted from the content may include various types of entities such as, for example, a name of a person, a title, a date, a location, and the like. In order to generate query suggestions, additional entities are extracted from the content, wherein the additional entities relate to extracted entities. As used herein, an entity can relate to another entity when there is a semantic relationship between the two entities. A semantic relationship in this context is a meaningful relationship between two entities found in an instance of content.

For example, in one embodiment, the content includes scholarly articles from an academic database. Scholarly articles typically contain entities of interest such as, for example, names of authors, names of collaborating researches, citations to other articles or publications, titles of articles, topics (subject matter), names of journals in which articles are published, and the like. Index 222 is created, in an embodiment, by parsing the articles to extract any number of these entities. For example, various documents are parsed to extract the name of a particular author. Then, the names of collaborating authors or researchers that occur in the same documents (i.e., co-occur with the name of the particular author) are extracted as well.

In an embodiment, the name of a particular author (or title, topic, etc.) is mapped (i.e., associated) to the name of another author (or title, topic, etc.) that appears in the same document. This mapping may be represented as a listing, a database, a table, chart, and the like. In one embodiment, the mapping takes the form of an index, generated in XML and is configured so that it is searchable. An entity is associated with a number of other entities. In one embodiment, an entity is associated with other entities of the same type. An entity can also be associated with other entities of different types. For example an author can be associated with titles of articles that the author contributed to. As another example, in the case of an entertainment information database, an actor can be associated with titles of movies in which the actor appeared, with names of directors with which the actor has worked, or names of other actors which whom the actor has appeared in movies. A variety of possibilities is contemplated, and the extent of index 222 is variable according to desired query suggestion parameters.

In various embodiments, the entries in an index provide query suggestions. In an embodiment, the entities associated with any given entry (which is, itself, an entity) are ranked, thus providing a mechanism for presenting the most relevant query suggestions based on a particular user query. Ranking can be achieved in a variety of ways. In one embodiment, for example, query suggestions are ranked according to an association score. An association score is calculated as a function of a weighted count of co-occurrences of two or more entities. That is, each entity associated with a first entity is assigned a count based on the number of times that entity appears in the content with the first entity. This is referred to, in an embodiment, as a co-occurrence count. In some embodiments, it may be desirable to assign a predetermined distance, or threshold, such that a co-occurrence, for the purposes of generating a count, only occurs when the first entity and the additional entity appear within a certain distance of each other. This distance may be defined by a predetermined number of words, a predetermined number of documents, and the like.

In an embodiment, counts corresponding to each entity and one of its associated entities are weighted mathematically to compute an association score. Entities associated with a particular entity are ranked based on the corresponding association scores. In various embodiments, these scores are calculated in different ways, and the algorithms used can incorporate variables that take into account user query trends, the nature of the information, the type of entities associated, the size of index 222 and various other factors. In further embodiments, rather than parse the content directly to create index 222, reference logs 236 corresponding to content is retrieved and parsed to create index 224. The creation of the index 224 can be achieved in much the same manner as described above, however, in the case that the parsing and extracting is done with reference logs 236, the processing power and time is minimized to some degree.

Query suggestion sever 218 may include a number of databases, and likewise, database 220 may include a number of indexes corresponding to a number of various content servers 230, documents, 234, and reference logs 236. Additionally, query suggestion server 218 provides query suggestion service to a plurality of search servers, in an embodiment, and can include indexes corresponding to a plurality of content servers. In other embodiments, a number of query suggestion servers provide query suggestions services to a single search server or content server. In some embodiments, index 222 and/or 224 is created offline at periodic intervals. In other embodiments, index 222 and/or 224 is dynamically updated as the content on content server 230 is updated.

Turning now to FIG. 3, a flow diagram is provided that shows an exemplary method 300 for suggesting additional queries related to a user's query according to an embodiment of the present invention. Although each of methods 300, 400 (FIG. 4), 500 (FIG. 500) presented below are presented as a sequence of steps, it will be appreciated by those skilled in the art that similar methods may be performed according to the present invention that involve the same or similar steps illustrated in FIGS. 3-5, but performed in different orders. Nothing in this example is intended to limit the implementation of such a method to the particular order of steps illustrated herein.

Initially, as illustrated at step 310, content is retrieved from a content server. The content retrieved from the content server includes one or more instances of informational content, as described above with reference to FIG. 2. Each of the instances of content is a document as defined herein, and each document includes one or more entities. In an embodiment, the content server may include an academic literature database, a database associated with information relating to entertainment, or the like. Additionally, the content retrieved may include, in other embodiments, reference logs associated with documents stored on the content server.

At a step 320, the content is parsed to extract at least one of the entities associated with each document or other instance of content. At a step 330, at least one relationship between a first extracted entity associated with a first instance of content and a second extracted entity associated with at least a second instance of content is identified. A relationship, as used herein, refers to a semantic relationship and may include a co-occurrence of the first and second entities within an instance of content. In an embodiment, the second entity appears in at least a second instance of content, allowing for query suggestions that can return results corresponding to a different set of instances of content than would be returned from a query defining only the first entity.

At a step 340, an index is created based on the identified relationship. This process can be repeated as many times as necessary to identify any number of relationships between the first entity and a plurality of additional entities. Additionally, the process can be repeated to identify a plurality of relationships between any number of other entities and entities of other types, entities of the same types, and any combination of the above. The entries in the index are indexed according to entity, and information corresponding to a particular entity can include query suggestions. Thus, in response to a user query received from a search engine or search server associated with the content server, a query suggestion can be determined from the index and subsequently provided to the user. The query suggestion can include any number of entities having relationships to the entity defined in the user query.

Turning now to FIG. 4, a flow chart is shown which illustrates an exemplary method 400 for suggesting additional queries related to a query for an entity associated with content available from an informational database according to an embodiment of the present invention. At a first step 410, content is retrieved from a content server. The content includes a plurality of documents, each including entities. The content server can include an academic literature database or other similar informational database. In various embodiments, entities may include names of authors, names of researchers, citations to other articles, titles of articles, topics of articles, locations, names of publications, dates, times, and the like.

At a step 420, an index that references the retrieved documents is created. The index includes at least a relationship between a first entity associated with a first document and at least one second entity associated with a second document. In an embodiment, the index is created based on entities extracted from the documents themselves. In another embodiment, the index is created based on entities extracted from reference logs associated with the content server. In various embodiments, relationships can include mappings from a first entity to a second entity of the same type such as, for example, a mapping from one author name to another author name. In other embodiments, relationships include mappings from a first entity to a second entity of a different type such as, for example, a mapping from an author name to a topic.

At a step 430, a user query is received from a search engine that is associated with the content server. The user query includes an entity or information corresponding to an entity. At a step 440, the index is searched to determine at least one textual match between any entities defined in the user query and any relationship entries in the index. In an embodiment, this search is achieved by applying textual matching algorithms to determine whether an entity defined in the user query matches an entity defining an entry in the index. If a match is determined, a query suggestion based on the corresponding relationship is provided to the user, as shown at step 450.

Figure 5:
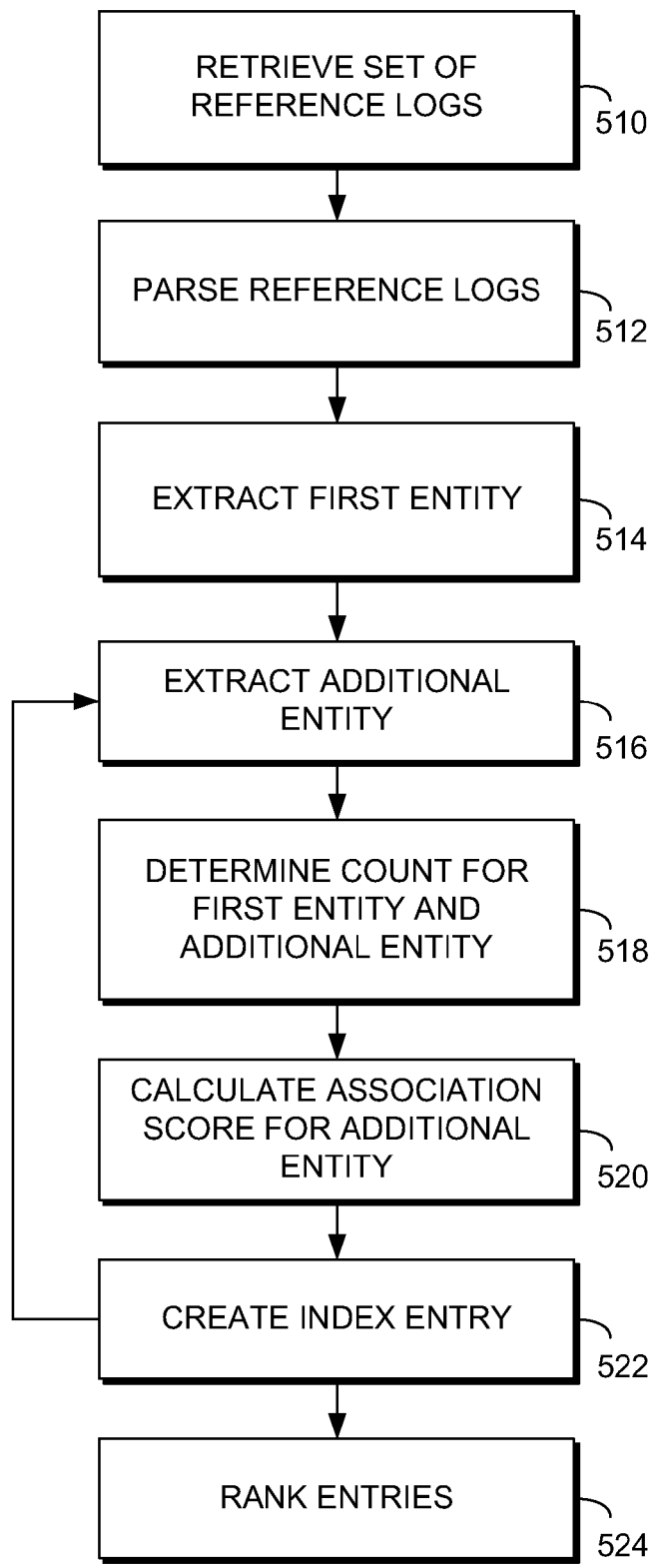
FIG. 5 is a flow diagram illustrating an exemplary method for suggesting additional queries related to a user's query for a first entity associated with content available from an informational database according to an embodiment of the present invention.

Turning now to FIG. 5, a flow chart is shown which illustrates an exemplary method 500 for suggesting additional queries related to a user's query for a first entity associated with content available from an informational database according to an embodiment of the present invention. At a first step, step 510, a set of reference logs is retrieved from a content server. In an embodiment, each reference log includes one or more entities associated with a document stored on the content server. At a step 512, the set of reference logs is parsed, and at step 514, a first entity is extracted. In an embodiment, the first entity can be an author name, a topic, a publication name, or the like.

As shown at a step 516, a second entity is extracted from each reference log that includes an association between the first and second entities. That is, any number of reference logs may include a co-occurrence, as defined herein, of two or more entities. That co-occurrence is considered to be an association or a relationship. Thus, every time the parsing reveals such a co-occurrence of the first and second entities, the second entity is extracted. Accordingly, as shown at step 518, a count is then determined and associated with the first and second entities. In an embodiment, the count includes a number of times the first and second entities appear within the set of reference logs with no more than a predetermined number of words between them. The first entity and the second entity can be the same type of entity in various embodiments. In various other embodiments, the first and second entities are different types of entities.

As shown at step 520, an association score is determined for the second entity. As described above, an association score comprises a weighted count associated with the first and second entities. At a step 522, an entry is created in a searchable index of entities. The entry corresponds to the first entity and includes a mapping between the first entity and the second entity. A corresponding entry can be created that corresponds to the second entity and includes a mapping from the second entity to the first entity. Thus, if a user submits a query for the first entity, a query suggestion can be returned that includes the second entity. Similarly, if a user submits a query for the second entity, a query suggestion can be returned that includes the first entity.

As illustrated by the flow diagram of FIG. 5, the process of extracting additional entities that co-occur with the first entity, determining counts, calculating association scores, and creating index entries corresponding thereto, may be repeated a number of times to create an index having a plurality of entries. For a given entity, the corresponding index entries are ranked, as shown at step 524. The ranking is based, as described above, on the association score corresponding to each additional entity. Thus, when a user query is received, in an embodiment, only several of the top-ranked query suggestions are returned. In other embodiments, all of the query suggestions are returned. In either case, the user may, in various embodiments, be provided with an indication of the ranking of query suggestions with respect to the first entity. In other embodiments, the user is not provided with such an indication.

As can be understood, embodiments of the present invention provide methods for generating searchable indexes of entities that co-occur throughout informational content with other entities. These entities can be mapped to one another to represent relationships which are used to generate query suggestions to further aid users in a searching experience. Other embodiments of the present invention provide for using reference logs associated with informational content to more easily extract entities and identify relationships. Further embodiments of the present invention provide for presenting query suggestions to a user such that the user can interact with the query suggestion to retrieve additional query results.

According to various embodiments, the present invention can be implemented in the context of computer-readable storage media. Indexes may be created by performing a series of steps and algorithms defined in machine-useable instructions embodied on the media. In further embodiments of the present invention, the methods described herein may be implemented within a particular application or system, or in any other manner known by those skilled in the art.

The present invention has been described in relation to particular embodiments, which are intended in all respects to be illustrative rather than restrictive. Alternative embodiments will become apparent to those of ordinary skill in the art to which the present invention pertains without departing from its scope and may include, for example, implementing query suggestion servers within an internal network, configuring the exemplary methods described herein to work within a particular application, and configuring the exemplary system and methods described herein to operate over a broader source of content such as the Internet. It will be understood that certain features and subcombinations are of utility and may be employed without reference to other features and subcombinations. This is contemplated by and is within the scope of the claims.

What is claimed is:

1. One or more computer-readable storage media having machine-useable instructions embodied thereon for performing a method for suggesting additional queries related to a user query, the method comprising:
retrieving content from a content server, wherein said content comprises a plurality of instances of informational content, each instance comprising one or more entities;
parsing the content to extract at least one of the one or more entities associated with each instance of content;
identifying at least one relationship between a first extracted entity associated with a first instance of content and a second extracted entity associated with at least a second instance of content, wherein the at least one relationship is a co-occurrence of the first extracted entity and the second extracted entity; and
creating an index based on said at least one identified relationship.

2. The media of claim 1, further comprising receiving a user query from a search engine associated with the content server, wherein said user query includes the first entity.

3. The media of claim 2, further comprising providing a query suggestion to the user, wherein the query suggestion comprises the second entity.

4. The media of claim 3, wherein the query suggestion further comprises an input region such that incident to receiving user input to the input region, the query suggestion is automatically submitted to the search engine.

5. The media of claim 1, wherein the content server comprises an academic literature database.

6. The media of claim 1, wherein the content server comprises a database associated with information relating to entertainment media.

7. One or more computer-readable storage media having machine-useable instructions embodied thereon for performing a method for suggesting additional queries related to a user query for an entity associated with content available from an informational database, the method comprising:
retrieving content from a content server, wherein said content comprises a plurality of documents, each document comprising one or more entities;
creating an index that references said documents, wherein the index comprises a relationship between at least one first entity associated with a first document and at least one second entity associated with a second document, wherein the relationship is a co-occurrence of the at least one first entity and the at least one second entity;
receiving a user query from a search engine associated with the content server, wherein the user query comprises the first entity;
searching the index to determine at least one textual match between the first entity and the relationship listed in the index; and
providing a query suggestion based on the relationship in the index.

8. The media of claim 7, wherein said content server comprises an academic literature database.

9. The media of claim 8, wherein the index is created based on extracted entities from reference logs associated with the academic literature database.

10. The media of claim 9, wherein said extracted entities comprise names of authors.

11. The media of claim 9, wherein said entities comprise topics associated with scholarly articles.

12. The media of claim 7, wherein said relationship comprises a mapping from the first entity to the second entity, wherein the first entity is a different type than the second entity.

13. The media of claim 7, wherein said relationship comprises a mapping from the first entity to the second entity, wherein the first entity is the same type as the second entity.

14. One or more computer-readable storage media having machine-useable instructions embodied thereon for performing a method for suggesting additional queries related to a user query for a first entity associated with content available from an informational database by, the method comprising:
retrieving a set of reference logs from a content server, wherein each reference log comprises a plurality of entities associated with a document stored on the content server;

parsing the set of reference logs;

extracting a first entity from a first reference log;

extracting a second entity from each reference log that comprises a relationship between the first and second entities, wherein a reference log has a relationship between the first and second entities if the reference log includes the first and second entities with not more than a predetermined number of words between them;

determining a count associated with the first and second entities, wherein the count comprises a number of times the first and second entities appear within the set of reference logs with no more than a first predetermined number of words between them;

calculating an association score for the second entity, wherein the association score comprises a weighted count associated with the first and second entities; and creating, in a searchable index of entities, an entry that corresponds to the first entity, wherein the entry comprises a mapping between the first entity and the second entity.

15. The media of claim 14, further comprising:

extracting a plurality of additional entities, wherein each of the additional entities is extracted from each reference log that comprises a relationship between the first entity and the additional entity;

determining a plurality of counts, wherein each count is associated with the first entity and one of the additional entities;

calculating an association score for each of the additional entities;

creating, in the searchable index of entities, a plurality of additional entries corresponding to the first entity, wherein each of the additional entries comprises a mapping between the first entity and one of the additional entities; and ranking each of the entries associated with the first entity based on the corresponding association scores.

16. The media of claim 15, further comprising receiving a user query, wherein the user query includes the first entity.

17. The media of claim 16, further comprising retrieving, from the index, a set of entries corresponding to the first entity.

18. The media of claim 17, wherein the set of entities comprises a second predetermined number of entries such that each of the set of entities is ranked higher than each entity not included in the set of entities.

19. The media of claim 14, wherein the first entity is a first type and the second entity is a second type.

20. The media of claim 19, wherein the first type comprises an author name and the second type comprises a topic.

* * * * *